(12) United States Patent
Kawaguchi et al.

(10) Patent No.: US 9,242,604 B2
(45) Date of Patent: Jan. 26, 2016

(54) HEAD-UP DISPLAY DEVICE

(71) Applicant: NIPPON SEIKI CO., LTD., Niigata (JP)

(72) Inventors: Tsuyoshi Kawaguchi, Niigata (JP); Takashi Yamazoe, Niigata (JP); Takeshi Yachida, Niigata (JP); Minoru Takebe, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/388,737

(22) PCT Filed: Mar. 7, 2013

(86) PCT No.: PCT/JP2013/056261
§ 371 (c)(1),
(2) Date: Sep. 26, 2014

(87) PCT Pub. No.: WO2013/146160
PCT Pub. Date: Oct. 3, 2013

(65) Prior Publication Data
US 2015/0035725 A1 Feb. 5, 2015

(30) Foreign Application Priority Data

Mar. 29, 2012 (JP) ................................. 2012-078120

(51) Int. Cl.
*B60R 1/00* (2006.01)
*B60K 35/00* (2006.01)
*G02B 27/01* (2006.01)
*B60K 37/04* (2006.01)
*G09G 3/00* (2006.01)

(52) U.S. Cl.
CPC . *B60R 1/00* (2013.01); *B60K 35/00* (2013.01); *B60K 37/04* (2013.01); *G02B 27/01* (2013.01); *G02B 27/0101* (2013.01); *G09G 3/002* (2013.01); *B60K 2350/2052* (2013.01); *B60K 2350/405* (2013.01); *B60R 2300/205* (2013.01); *G02B 2027/013* (2013.01); *G02B 2027/0118* (2013.01); *G09G 2320/0233* (2013.01); *G09G 2360/144* (2013.01)

(58) Field of Classification Search
CPC .. B60K 37/04; B60K 35/00; B60K 2350/405; B60K 2350/2052; G02B 27/01; G02B 27/0101; G02B 2027/013; G02B 2027/0118; B60R 1/00; B60R 2300/205; G09G 3/002; G09G 2320/0233; G09G 2360/144
USPC ................................ 345/7; 359/13, 630–633
See application file for complete search history.

(56) References Cited

FOREIGN PATENT DOCUMENTS

| JP | 4-25816 A | 1/1992 |
| JP | 6-144081 A | 5/1994 |
| JP | 9-54276 A | 2/1997 |

OTHER PUBLICATIONS

English translation of International Search Report PCT/JP2013/056261 dated Apr. 16, 2013.

*Primary Examiner* — Michael Pervan
(74) *Attorney, Agent, or Firm* — McDermott Will & Emery LLP

(57) ABSTRACT

Provided is a head-up display device that can detect background brightness with a simple constitution. A HUD device (1) is provided with: a display device (20) that outputs display light (L) that shows a display image; a combiner (50) that has a concave surface (50*a*) to which the display light (L) output by the display device (20) is incident, said combiner (50) concentrating the incident display light (L) so as to allow an observer (2) to see the display image from the concave surface (50*a*) side superimposed on a background from the front; and an optical sensor (31) that is positioned below the combiner (50) and detects the brightness of the light reaching that optical sensor (31). The combiner (50) has a light guide body (60) which is at the lower edge part thereof and is integrated with the combiner (50). The light guide body (60) has a facing surface (62) facing the optical sensor (31) in the vertical direction and guides external light incident from the front downward, outputting the guided light from the facing surface (62). The optical sensor (31) detects the brightness of the light output from the facing surface (62).

5 Claims, 5 Drawing Sheets

(a)

(b)

HEAD-UP DISPLAY DEVICE

CROSS REFERENCE TO RELATED APPLICATIONS

This application is the U.S. National Phase of PCT/JP2013/056261 filed Mar. 7, 2013, which claims priority to Japanese Patent Application No. 2012-078120 filed Mar. 29, 2012. The subject matter of each is incorporated herein by reference in entirety.

TECHNICAL FIELD

The present invention relates to a head-up display device.

BACKGROUND ART

As a head-up display (HUD) device, for example, one disclosed in Patent Literature 1 is known. The HUD device is provided with a display unit for displaying an image, and a combiner that can magnify and display the image, and can transmit a scene (background) in front of a vehicle, and is configured to allow a user to see display information such as a vehicle speed and mileage being superimposed on the front scene. The HUD device is further provided with an optical sensor for detecting background brightness for adjusting display brightness of the display unit in accordance with ambient brightness.

CITATION LIST

Patent Literature

Patent Literature 1: Japanese Unexamined Patent Application Publication No. H9-54276

SUMMARY OF THE INVENTION

Problems to be Solved by the Invention

The HUD device according to the Patent Literature 1 requires exclusive parts (a prism 16, a reflector 17) for guiding light to be detected to an optical sensor as shown in FIG. 6 and FIG. 7 attached to the Document, and the configuration tends to be complex.

The present invention has been made in view of the above circumstances, and it is an object to provide a head-up display device that can detect background brightness with a simple configuration.

Means for Solving the Problem

In order to achieve the above object, a head-up display device according to an aspect of the invention comprises:
a display unit that emits display light representing a display image;
a combiner that has a concave surface to which the display light emitted by the display unit is incident, and concentrates the incident display light to allow an observer to see the display image from the concave surface side superimposed on a background of the front; and
an optical detector that is positioned below the combiner, and detects brightness of light reached,
wherein the combiner has a light guide body that is integrated with the combiner at a lower end part thereof,
the light guide body has a facing surface that faces the optical detector in a vertical direction, guides external light from at least one of the front and above downward, of the external light incident, and emits the external light guided downward from the facing surface, and
the optical detector detects brightness of the light emitted from the facing surface.

In the head-up display device, the light guide body may has a reflection surface that reflects downward the external light incident from the front, and may be configured to emit the external light reflected by the reflection surface from the facing surface.

The head-up display device may be provided with a cover part that covers a part of the facing surface from the lower side, and disturbs the optical path of the light that is passed through the light guide body from above the combiner, and directed downward.

In the head-up display device, a light-shielding cover member that covers the upper side of the combiner may be provided, and may be configured to prevent incidence of external light from the upper side.

The head-up display device may be provided with an adjustment means that adjusts the display brightness of the display unit based on the brightness of the light detected by the optical detector.

Effect of the Invention

According to the present invention, it is possible to provide a head-up display device capable of detecting background brightness with a simple configuration.

MODES FOR CARRYING OUT THE INVENTION

Hereinafter, a HUD device according to an embodiment of the present invention will be described with reference to the drawings.

Figure 1:
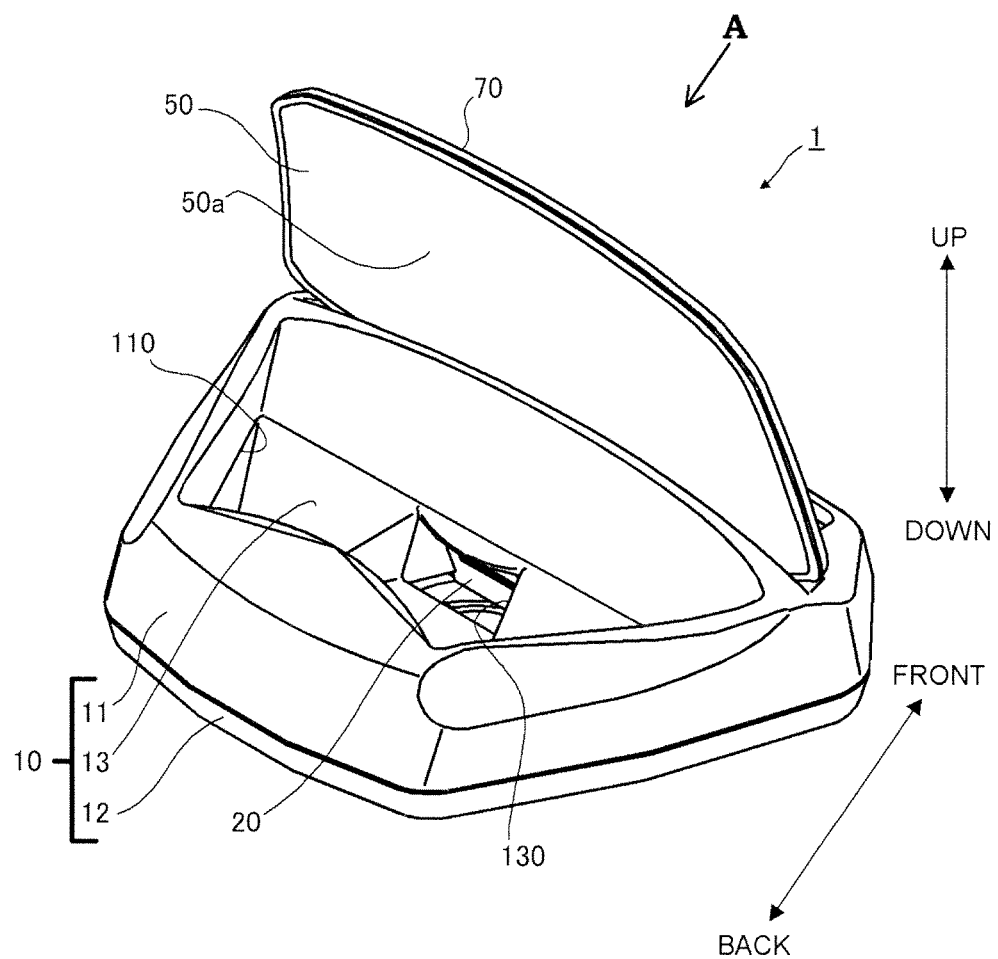
FIG. 1 is a perspective view of a HUD device according to an embodiment of the invention.
Figure 2:
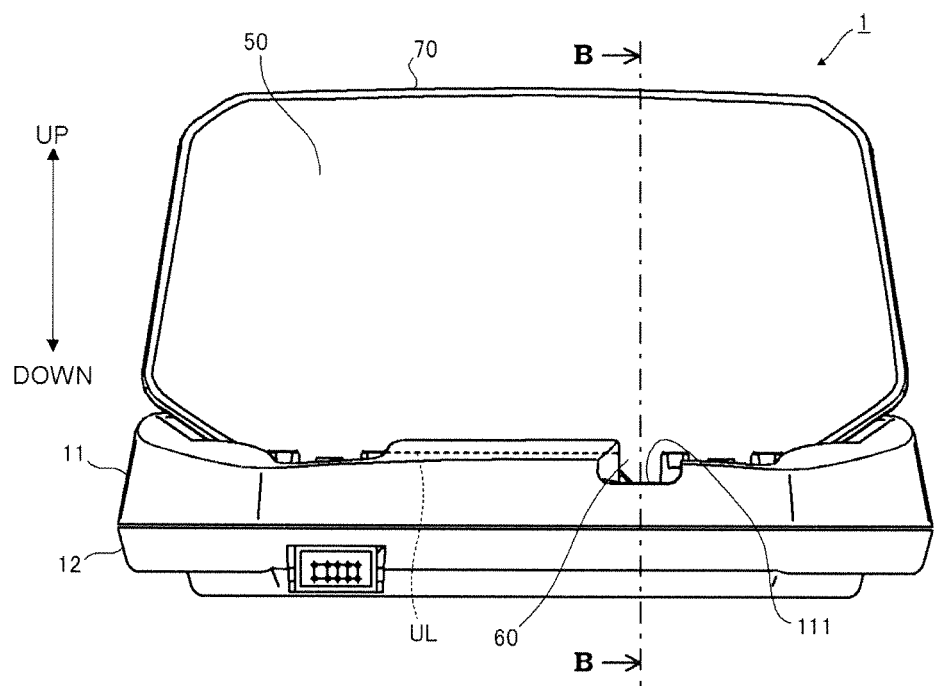
FIG. 2 is a view of the HUD device as seen from the direction of the arrow A (from the front) shown in FIG. 1.
Figure 3:
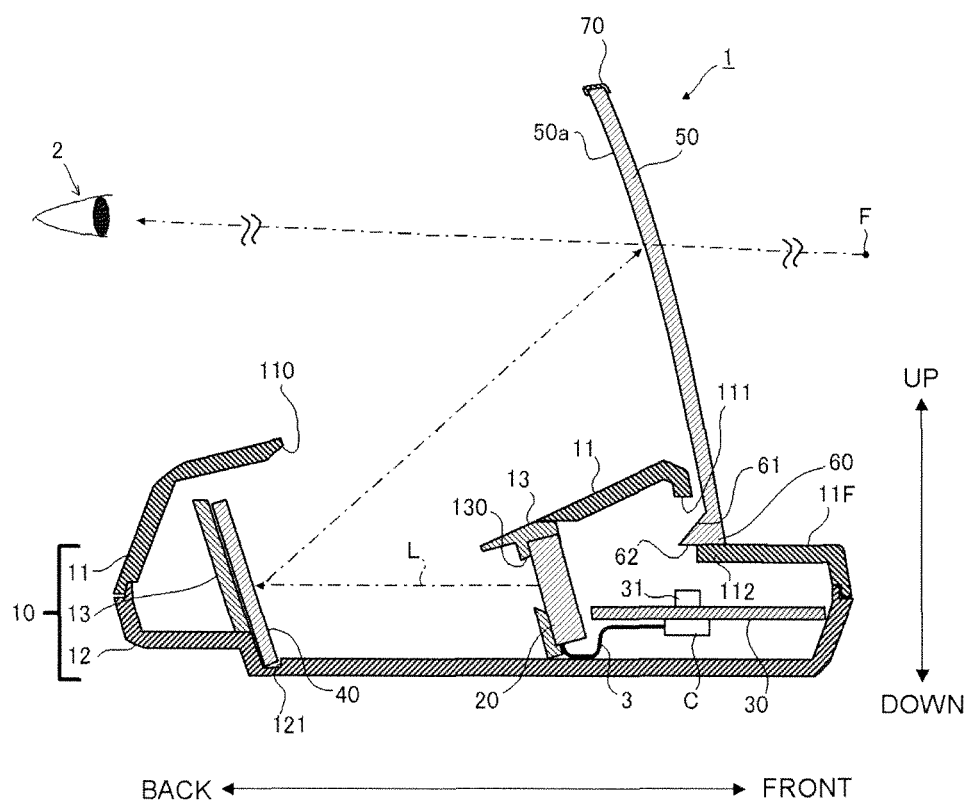
FIG. 3 is a line B-B schematic cross-sectional view of the HUD device shown in FIG. 2.

The HUD device 1 comprises, as shown in FIGS. 1 to 3, a case body 10, a display unit 20, a circuit board 30, a reflection part 40, a combiner 50, a light guide body 60 formed integrally with the combiner 50, and a cover member 70.

The HUD device 1 is configured as a stationary HUD device that is installed on a vehicle dashboard (e.g., above an instrument panel). In the following description, the components of the HUD device will be appropriately explained, assuming that as seen from an observer to see a display image displayed by the HUD device 1, an upward direction is "up", a downward direction is "down", a forward direction is "front", and a backward direction is "back", respectively (see the arrows at both ends of FIG. 1 and FIG. 3).

The case body 10 comprises an upper case 11, a lower case 12, and a middle case 13. In the upper case 11, a first opening part 110 is formed. A shape like a box with the upper side opened is formed by connecting the upper case 11 and lower case 12. In the box shape, the display unit 20, the circuit board 30, and the middle case 13 are housed.

The upper case 11 has a mounting part (not shown) to mount the combiner 50, on the side ahead of the first opening part 110 thereof. A lower end part of the combiner 50 is fixed to the mounting part with a screw, for example. In this manner, the upper case 11 holds the combiner 50. The combiner 50 held by the upper case is shaped such as extended upward from the upper case 11.

Further, in the upper case 11, a second opening part 111 is formed for exposing the light guide body 60 forward and passing incident light (external light N1 described later) through the inside of the case body 10.

The middle case 13 is placed on the lower case 12. In the lower case 12, as shown in FIG. 3, a concave part 121 having a shape corresponding to the lower end portion of the reflection part 40 is formed. The reflection part 40 is held by the concave part 121 and a part (a rear inner surface) of the middle case 13. (For example, the reflection part 40 is held with one end inserted into the concave part 121 and a rear side surface fixed to the middle case 13 with adhesive tape or the like.)

The middle case 13 is a substantially cylindrical member, and the display unit 20 is disposed on a part of the outside surface thereof (on the right side in FIG. 3). In the middle case 13, an emission port 130 that is a port to expose a display surface of the display unit 20 is formed. The middle case 13 may be provided with a transparent window member covering the emission port 130.

The display unit 20 is configured to emit display light L representing a display image for notifying display information such as a vehicle speed and mileage, and comprises of a transmissive liquid crystal display comprising a liquid crystal panel and a backlight light source, or a self-luminous display, for example.

The circuit board 30 is a printed circuit board formed by implementing a control unit (not shown) comprised of a microcomputer including a memory, such as a CPU and ROM, a graphic display controller (GDC) or the like on a place-shaped base material made of resin including a glass fiber or the like. The circuit board 30 is fixed to the lower case 12 by a not-shown fixing member, for example, and is located in front of the display unit 20 and between the upper case 11 and lower case 12. The circuit board 30 and display unit 20 are conductively connected via a flexible printed circuit (FPC) 3. One end of the FPC 3 is connected to the circuit board 30 via a connector C. The control unit acquires vehicle state information transmitted from an external device (not shown) such as a vehicle electronic control unit (ECU) via a communication line, and drives the display unit 20 according to the information (namely, displays a predetermined display image on the display unit 20).

On the circuit board 30, an optical sensor 31, an amplifier circuit (not shown), a drive circuit (not shown) to drive the display unit 20 or the like are mounted.

The optical sensor 31 is for detecting brightness of light reached, and disposed opposite to a facing surface 62 of the light guide body 60 described later, so that an optical axis of light incident to the optical sensor 31 is along the vertical direction (see FIG. 4). The optical sensor 31 supplies the amplifier circuit with a detection signal representing the brightness of light reached. The amplifier circuit amplifies the detection signal detected by the optical sensor 31, and supplies it to the control unit. The control unit adjusts the brightness of the display image displayed by the display unit 20 via the drive circuit based on the obtained detection signal. For example, when a value indicating the brightness of the light received by the optical sensor 31 is lower than a threshold value (previously stored), a background is assumed to be dark. Thus, The display brightness of the display unit 20 is increased by a predetermined degree. Specifically, for example, when the display unit 20 comprises a transmissive liquid crystal display, the brightness of the backlight light source is increased.

The reflection part 40 is located on the display side of the display unit 20, that is, the exit side of the display light L, and reflects the reached display light L toward the combiner 50. The reflection part 40 is made of an aluminum deposited resin molded product, for example, and has a reflection surface configured as a curved surface for effectively reflecting the display light L from the display unit 20 to the combiner 50 (in FIG. 3, the reflection surface is schematically shown as a plane). Further, as the reflection part 40 is held by the concave part 121 and a part of the middle case 13 as described before, the reflection surface is arranged so as to substantially facing the display side of the display unit 20. The display light L emitted by the display unit 20 reaches the reflection part through the emission port 130. The display light L reflected by the reflection part 40 is directed to the combiner 50 through the first opening part 110 of the upper case 11.

The combiner 50 comprises a plate-shaped half-mirror having a curved surface, a hologram element, or the like. As described before, the combiner 50 is attached to the upper case 11, and a concave surface 50a thereof is substantially opposite to the reflection surface of the reflection part 40. As shown in FIG. 3, the combiner 50 changes the optical path of the incident display light L after reflected by the reflection part 40 (changes the optical path of the display light L by reflection when a half-mirror is used as the combiner 50, and changes the optical path of the display light L by diffraction when a hologram element is used). The concave surface 50a of the combiner 50 has a function of condensing the display light L, and is configured as a curved surface capable of forming a virtual image far front (for example, about 1 m ahead of the combiner 50) compared with the case of simply reflecting the light. The combiner 50 forms a virtual image of a display image at a front position F thereof, and passes the light from the front, whereby the HUD device 1 can allow an observer 2 to see both a virtual image and a real scene present in the front.

The light guide body 60 is formed integrally with the combiner 50, and projected downward from a part of the lower end portion of the combiner 50, for example, as shown in FIG. 2. (For reference, in FIG. 2, the lower end UL of the combiner 50 is represented by a dotted line.) As shown in FIG. 3, the cross-section of the light guide body 60 is formed in a substantially triangular shape.

The light guide body 60 is for guiding external light from a predetermined direction toward the optical sensor 31, and formed having a reflection surface 61 and a facing surface 62.

Figure 4:
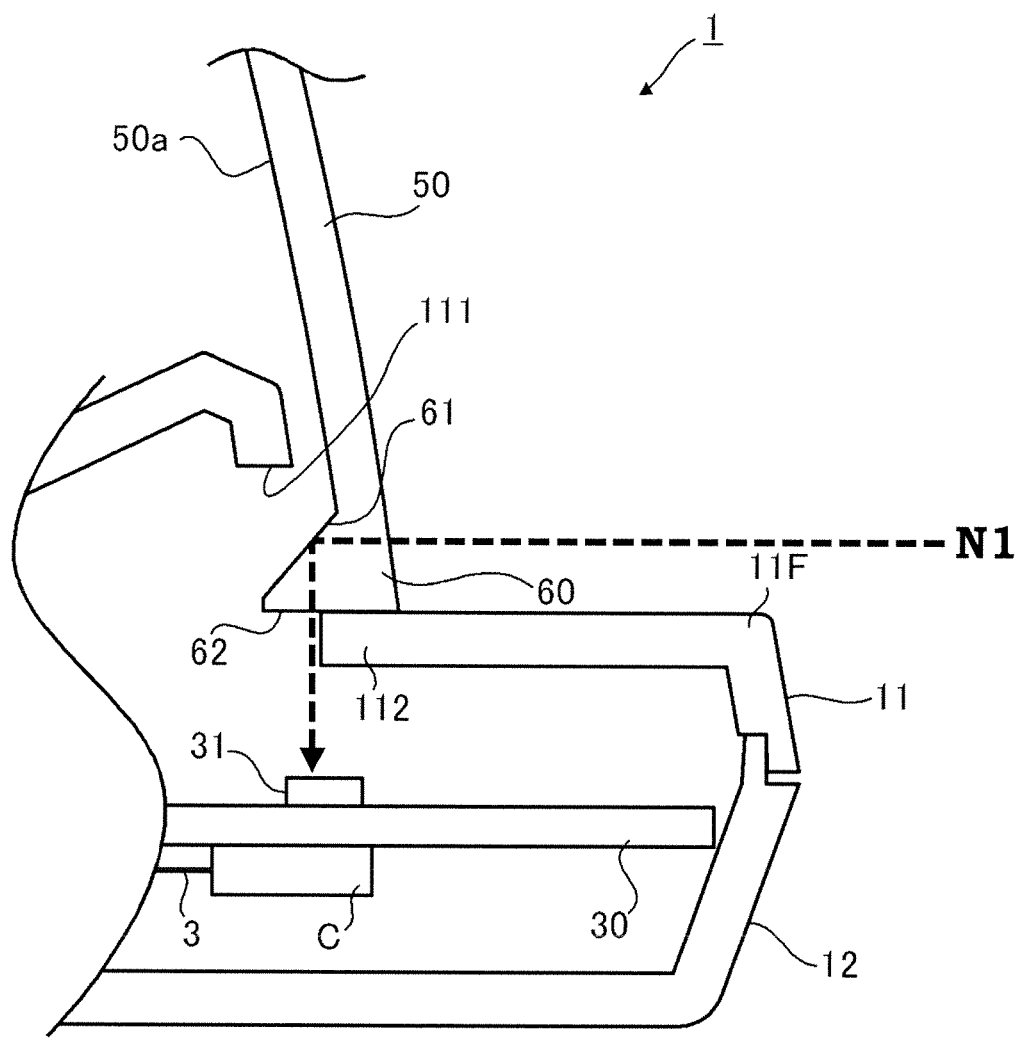
FIG. 4 is an enlarged view of an essential part of the HUD device shown in FIG. 3, primarily for explaining a function of a light guide body.

The reflection surface 61 is an inclined surface on the rear side of the light guide body 60 (inclined by 45° with respect to the longitudinal direction, for example), and effectively reflects downward the external light N1 incident from the front to the light guide body 60 as shown in FIG. 4 (hereinafter, external light from the front is given a reference symbol "N1"). FIG. 4 shows a magnified essential part of the HUD device 1 in the schematic cross-sectional view shown in FIG. 3. In FIG. 4, a hatching representing a cross section is omitted (same in FIGS. 5(a) and (b) according to a modification described later).

The facing surface 62 is a lower surface of the light guide body 60, and is a surface opposite to the optical sensor 31 in the vertical direction. The facing surface 62 functions as an emission surface that emits the light guided downward by the light guide body 60 to the outside.

A part of a front part 11F that is a part of the upper case 11 ahead of the combiner 50 serves as a cover part 112 covering a part of the facing surface 62 from the lower side. The upper case 11 is configured such that the cover part 112 covers only a part of the optical path of the external light N1 that is reflected by the reflection surface 61, emitted from the facing surface 62, and directed to the optical sensor 31.

The cover member 70 is a member covering a side of the combiner 50, and made of a light-shielding resin material. The cover member 70 is provided for protecting a side of the combiner 50 (for example, protection from shock) and for preventing the incidence of external light to the combiner 50 (particularly, from the upper side surface located above the optical sensor 31). Of course, as shown in FIG. 2, the cover member 70 is configured not to cover a part of the light guide body 60.

It is also possible to prevent the light incident from the upper side of the combiner 50 from reaching the optical sensor 31 as much as possible by the cover part 112 without providing the cover member 70. For this purpose, the cover part 112 may be provided so as to block the optical path of the external light incident from the upper side of the combiner 50 (namely, the external light directed downward without being reflected by the reflection surface 61) without disturbing the optical path of the external light that is reflected by the reflection surface 61 and directed downward.

Now, how the external light N1 reaches the optical sensor 31 will be explained by referring to FIG. 4.

The external light N1 from the front of the combiner 50 enters from the front side of the light guide body 60, and reflects on the reflection surface 61. The reflected external light N1 is guided to the inside of the light guide body 60, directed downward, and emitted from the facing surface 62.

The external light N1 emitted from the facing surface 62 reaches the optical sensor 31 opposing the facing surface 62. The optical sensor 31 detects the brightness of the external light N1, and in response thereto, the control unit appropriately adjusts the brightness of the display unit 20 based on the detection result as described before.

Particularly, in the embodiment, as the cover member 70 is provided on the side of the combiner 50, external light does not enter from the side (particularly, the upper side of the upper part of the optical sensor 31). Thus, the external light N1 mainly from the front can be sensed. In this manner, as the front of the combiner 50 is a background direction for the observer 2 when watching a display image, the brightness of the external light N1 can be regarded as the brightness of substantially background. Thus, for example, even when the vehicle interior is dark in the daytime in a tunnel near an exit and a display image projecting direction (namely, forward and background direction) is bright, it is possible to adjust the brightness of the projected image to appropriate brightness in accordance with the brightness in the projecting direction before the vehicle leaves the tunnel.

From here, a HUD device according to a modification will be explained by referring to FIGS. 5(a) and (b). Parts having similar functions as those of the embodiment will be denoted by the same reference numerals, and description overlapping with the embodiment will be omitted.

(Modification 1)

Figure 5:
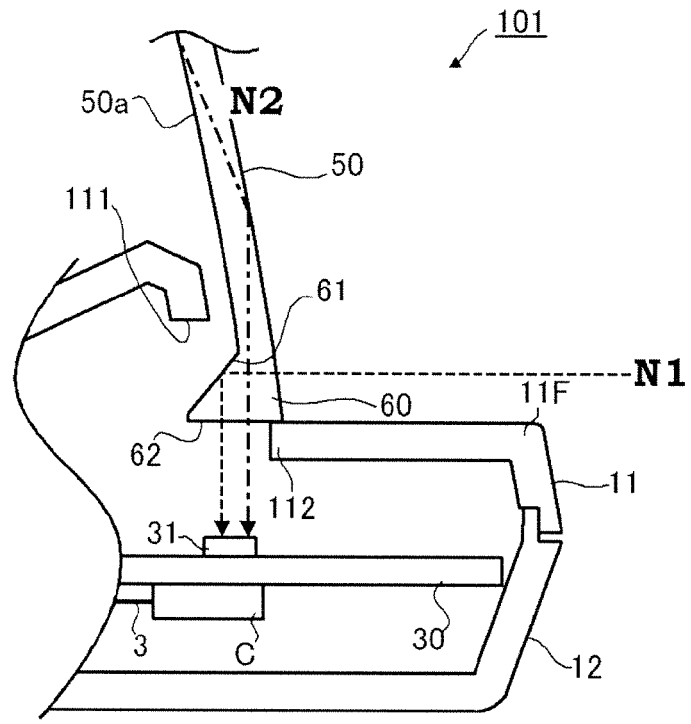
FIG. 5(a) is an enlarged view of an essential part of a HUD device according to a modification 1.
FIG. 5(b) is an enlarged view of an essential part of a HUD device according to a modification 2.
Figure 5:
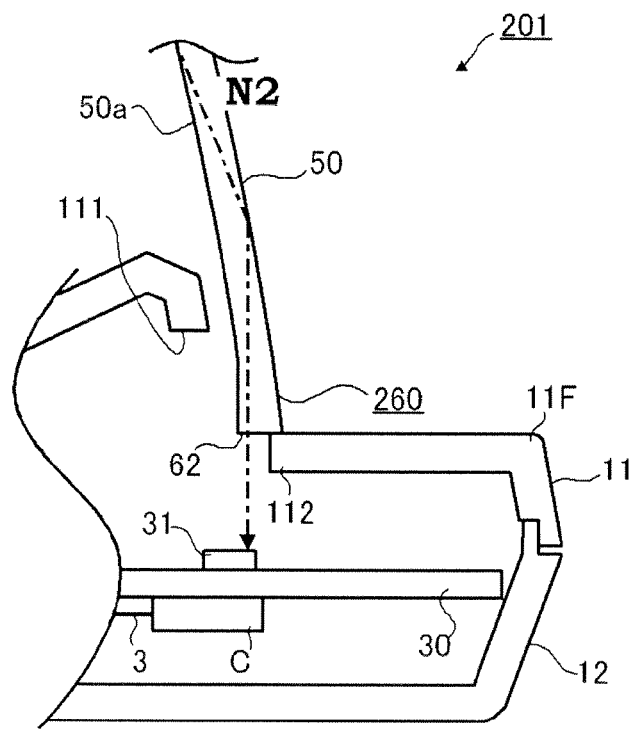

A HUD device 101 according to a modification 1 is, as shown in FIG. 5(a), configured to detect not only external light N1 from the front, but also external light N2 from above (hereinafter, external light from above is denoted by a reference symbol "N2").

For detecting the external light N2 from above, a cover member 70 may not be provided, or at least a part of the cover member 70 located above an optical sensor 31 (the part near a B-B line in FIG. 2) May be cut out. Of course, in this case, a cover part 112 is provided so as not to disturb the optical path of the external light N2 incident from the upper side of a combiner 50.

Such a configuration is useful when background brightness can be more reflected by detecting the external light N2 from above, in accordance with the vehicle interior environment.

(Modification 2)

A HUD device 201 according to a modification 2 is, as shown in FIG. 5(b), configured to be able to detect external light N2 from above without detecting external light N1 from the front as much as possible.

In this case, similar to the modification 1, a cover member 70 may not be provided, or at least a part of the cover member 70 located above an optical sensor 31 may be cut out. A cover part 112 is provided so as not to disturb the optical path of the external light N2 incident from the upper side of a combiner 50. To detect only the external light N2 from above, the reflection surface 61 as described above is not formed in a light guide body 260 according to the modification 2.

Such a configuration is useful when the external light N2 from above is dominant to the background brightness due to any factor.

The HUD device 1 (or 101, 201) explained above comprises a display unit 20 that emits display light L representing a display image;

a combiner 50 that has a concave surface 50a to which the display light L emitted by the display unit 20 is incident, and concentrates the incident display light L so as to allow an observer 2 to see the display image from the concave surface 50a side superimposed on a background of the front; and an optical sensor 31 (an example of an optical detector) that is positioned below the combiner 50, and detects brightness of light reached, wherein the combiner 50 has a light guide body 60 that is integrated with the combiner 50 at a lower end part thereof, the light guide body 60 has a facing surface 62 that faces the optical sensor 31 in a vertical direction, guides external light from at least one of the front and above downward, of the external light incident, and emits the external light guided downward from the facing surface 62, and the optical sensor 31 detects brightness of the light emitted from the facing surface 62.

As described above, since the light guide body for guiding light to the optical sensor is configured integrally with the combiner, the HUD device 1 (or 101, 201) has a simple structure. Further, as the number of parts can be decreased, the cost can be reduced.

Particularly, in the HUD device 1 and the HUD device 101 according to the modification 1, the light guide body 60 has a reflection surface 61 that reflects downward the external light N1 incident from the front, and emits the external light reflected by the reflection surface 61 from the facing surface 62. Thus, as described above, it is possible to effectively detect the brightness in the background direction.

The present invention is not to be limited to the aforementioned embodiment, modifications (modifications 1 and 2), and drawings. It is of course possible to add various changes and modifications (including elimination of the constituent elements) to them.

The above description shows an example that the angle of the reflection surface 61 of the light guide body 60 is 45 degrees, but not limited thereto. It is possible to adjust (suppress) the amount of the external light N1 reaching the optical sensor 31 by displacing the reflection surface 61 from the tilt angle of 45 degrees.

The above description shows an example that the display light L from the display unit 20 is reflected by the reflection part 40 and reached to the combiner 50, but not limited thereto. The HUD device may be configured such that the display unit emits the display light L directly to the combiner. In this case, the display unit and combiner are arranged so as to substantially opposite to each other, and the reflection part 40 is unnecessary.

In the above description, an automobile is taken as an example of vehicles to install the HUD device 1 (hereinafter, including the HUD devices 101 and 201), but not to be limited thereto. The HUD device 1 may be installed in the vicinity of a driver's seat in a ship, an airplane, or other vehicles. Further, the installation place is not limited to the vicinity of a driver's seat of a vehicle. It may also be applied to tabletop interiors or the like to be placed indoors.

In the above description, the HUD device 1 has been explained as a stationary type. However, for example, the HUD device 1 may be configured integrally with a dashboard of a vehicle.

In the above description, unimportant known techniques are appropriately omitted to facilitate understanding of the present invention.

INDUSTRIAL APPLICABILITY

In the aforementioned embodiment, a head-up display device for a vehicle has been explained as an example of application. However, it is possible to apply the invention to a ship or special vehicles such as agricultural machinery and construction equipment.

DESCRIPTION OF REFERENCE NUMERALS

1 HUD device
2 Observer
10 Case body
11 Upper case
11F Front part
110 First opening part
111 Second opening part
112 Cover part
12 Lower case
121 Concave part
13 Middle case
130 Emission port
20 Display unit
30 Circuit board
31 Optical sensor
40 Reflection part
50 Combiner
50a Concave surface
60 Reflection surface
62 facing surfaces
70 Cover member

The invention claimed is:

1. A head-up display device comprising:
a display unit configured to emit display light representing a display image;
a combiner configured to have a concave surface to which the display light emitted by the display unit enters, and to concentrate the incident display light to allow an observer to see the display image from the concave surface side superimposed on a background of the front; and
an optical detector configured to be positioned below the combiner, and detects brightness of light reached,
wherein the combiner has a light guide body that is integrated with the combiner at a lower end part thereof,
the light guide body has a facing surface that faces the optical detector in a vertical direction, guides external light from at least one of the front and above downward, of the external light incident, and emits the external light guided downward from the facing surface, and
the optical detector detects brightness of the light emitted from the facing surface.

2. The head-up display device according to claim 1, wherein
the light guide body has a reflection surface that reflects downward the external light incident from the front, and is configured to emit the external light reflected by the reflection surface from the facing surface.

3. The head-up display device according to claim 1, further comprising a cover part that covers a part of the facing surface from the lower side, and disturbs the optical path of the light that is passed through the light guide body from above the combiner, and directed downward.

4. The head-up display device according to claim 1, further comprising a light-shielding cover member that covers the upper side of the combiner, and is configured to prevent incidence of external light from the upper side.

5. The head-up display device according to claim 1, further comprising an adjustment means that adjusts the display brightness of the display unit based on the brightness of the light detected by the optical detector.

* * * * *